Dec. 3, 1963   R. DOYLE ETAL   3,112,522
BLOW MOLDING EQUIPMENT

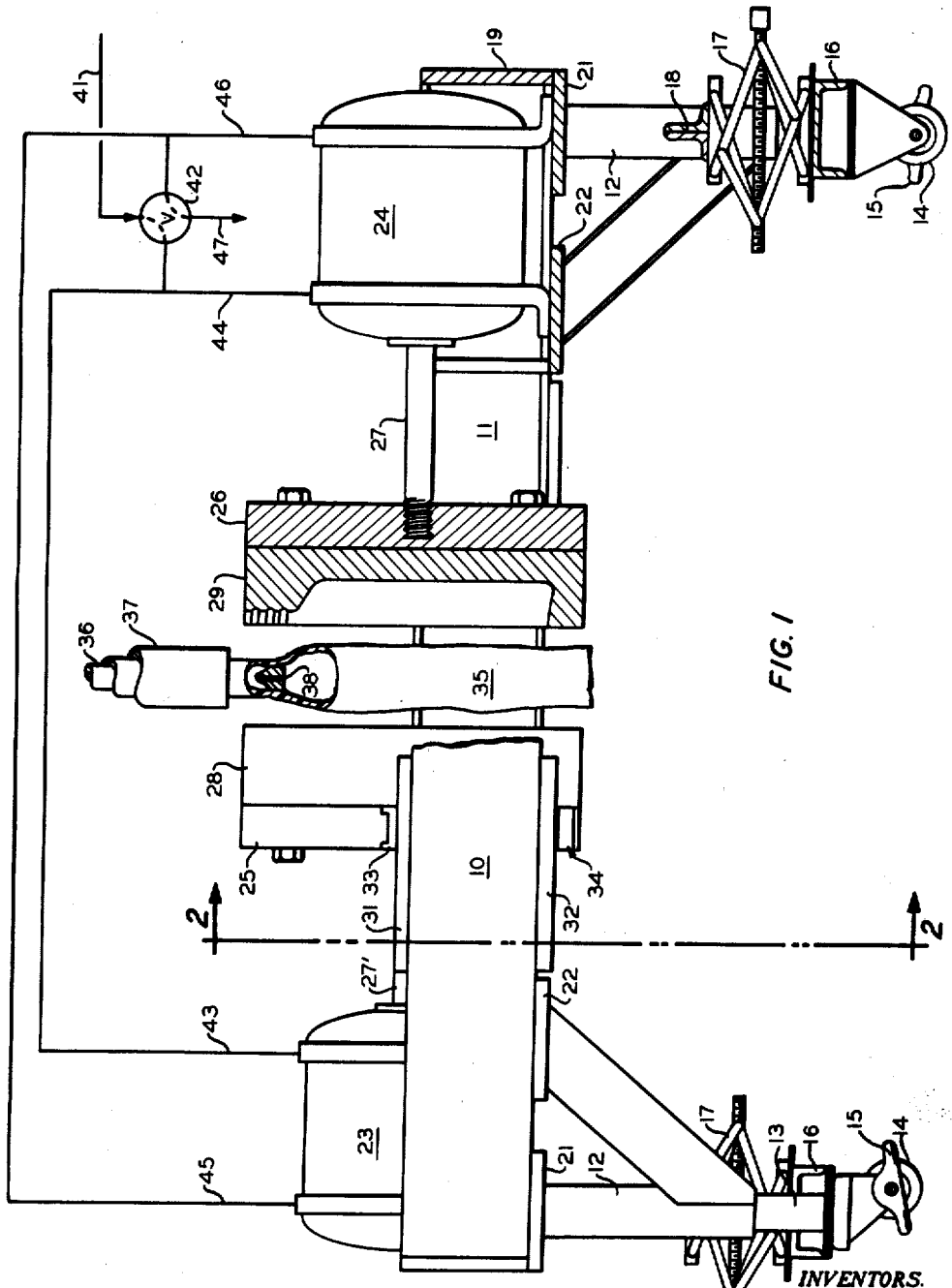

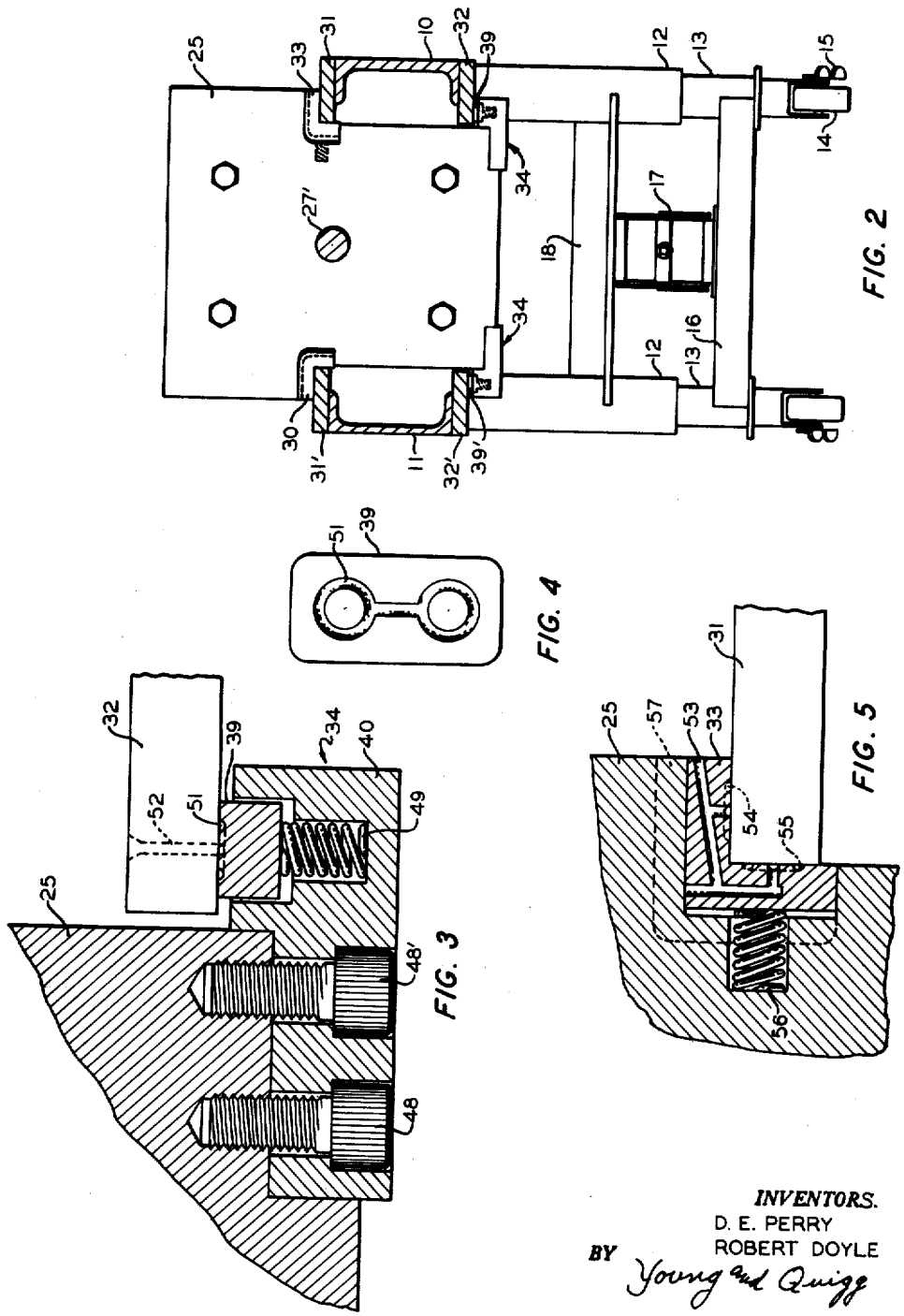

Filed Nov. 16, 1961   3 Sheets-Sheet 3

INVENTORS.
D. E. PERRY
ROBERT DOYLE
BY Young and Quigg
ATTORNEYS

United States Patent Office 3,112,522  
Patented Dec. 3, 1963

3,112,522  
BLOW MOLDING EQUIPMENT  
Robert Doyle and Daniel E. Perry, both of Bartlesville, Okla., assignors to Phillips Petroleum Company, a corporation of Delaware  
Filed Nov. 16, 1961, Ser. No. 152,726  
6 Claims. (Cl. 18—5)

This invention relates to blow molding equipment. In one aspect it relates to blow molding equipment for testing or proofing molding dies. In another aspect it relates to a simple, inexpensive and portable blow molding apparatus for low volume operations. In still another aspect it relates to a portable molding apparatus capable of handling both small and large molding dies.

In the molding of hollow objects from thermoplastic material it is usually necessary to test new dies in the production molding equipment with the result that considerable loss in production results particularly if the molding dies when first used require alteration or correction. It is also often necessary to disrupt production of standard items and use the production equipment to mold articles for special orders or other requirements for low volume production.

It is therefore an object of this invention to provide means for the proofing of molding dies for molding thermoplastic articles. It is also an object to provide a portable molding apparatus capable of handling a great variety of sizes of molds. It is also an object of the invention to provide bearing mountings for the platens which will allow an adjustment in the closing of the mold dies so as to allow closure of the mold when the dies are not in perfect alignment. A further object of the invention is the provision of a molding apparatus for manual or automatic proofing of mold dies.

Figure 8:
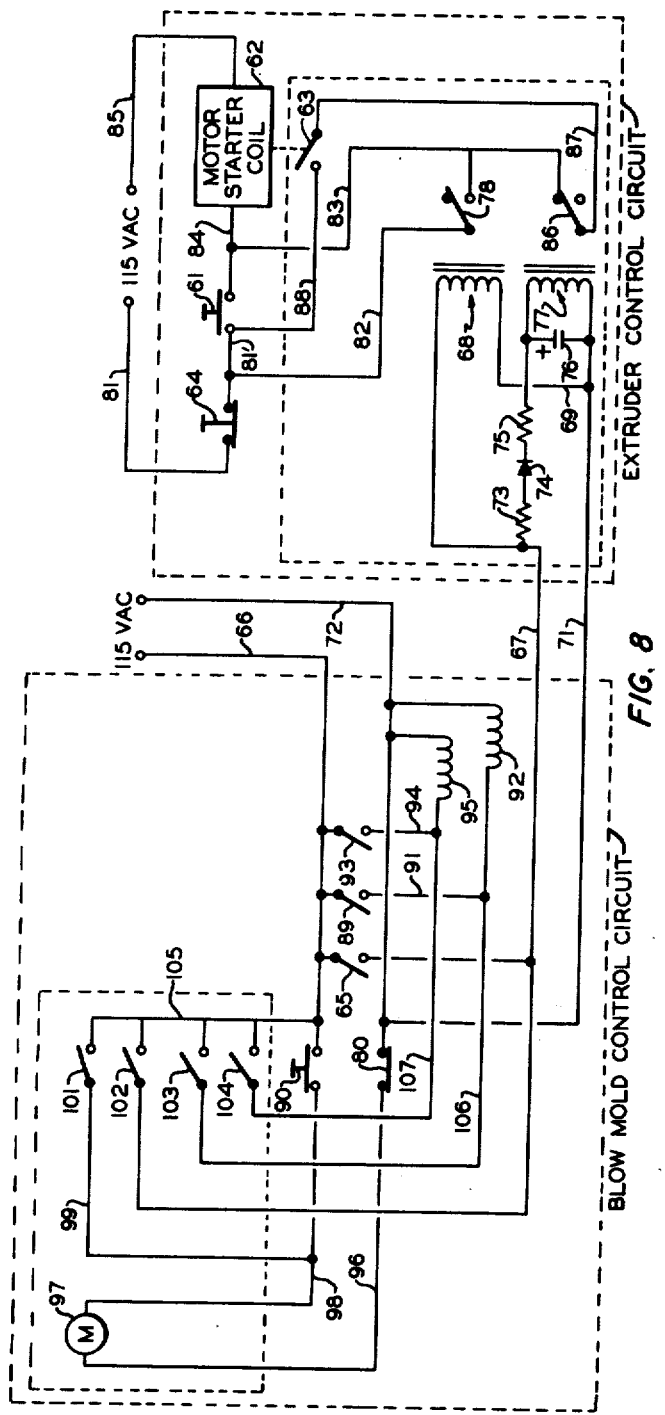
Figure 7:
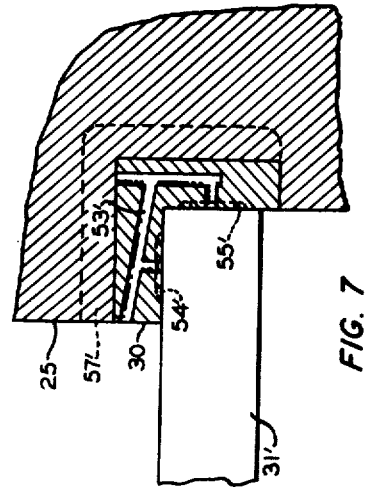
Figure 6:
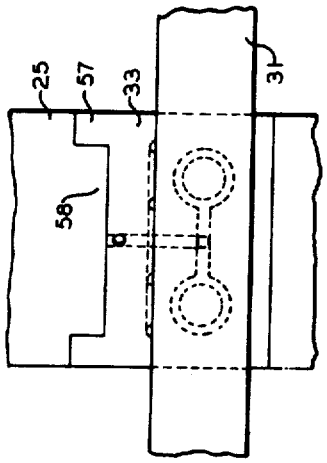

FIGURE 1 is a side elevation, partly in section, of the apparatus of the invention;  
FIGURE 2 is a view along line 2—2 of FIGURE 1;  
FIGURE 3 is a detail of the bottom bearing assembly of FIGURE 2;  
FIGURE 4 is a plan view of the bearing of FIGURE 3;  
FIGURE 5 is a detail of a spring loaded upper bearing of FIGURE 1;  
FIGURE 6 is another view of the bearing of FIGURE 5;  
FIGURE 7 is a detail of a non-spring loaded upper bearing of FIGURE 2; and  
FIGURE 8 is a sketch of the electrical circuit for the molding apparatus and extruder.

According to our invention, we have provided a molding apparatus which is particularly adapted to the proofing or testing of molding dies. It is also applicable for use in the production of blow molded articles wherein continuous production is not desired or justified because the molding apparatus is simple and relatively inexpensive to construct, is automatic through a complete cycle, and is portable. It is a feature of the molding apparatus that a great variety of sizes of molds can be used or tested because of the method of supporting and operating the platens. The platens slide on horizontal guide rails which are in contact with bearings on the outer edges of the platens. The platens will, therefore, accommodate a mold die whose dimensions are substantially as large as those of the platens.

An important feature of the apparatus of our invention comprises the bearings on the platens. The bearings are preferably of bronze or other suitable bearing metal and are lubricated by supplying lubricant to grooves in the surface of the bearing in contact with the slide. It will be noted in the detailed description of the drawing that the two bottom bearings are spring loaded and that one of the top bearings is spring loaded. This enables the mold dies to adjust to imperfections in matching such as might be caused by thermoplastic material being inadvertently caught between the edges of the mold dies.

Referring now to FIGURE 1, the apparatus comprises a frame composed of side members 10 and 11 and leg members indicated at 12 (the four legs can be identical). The legs are in the form of hollow cylinders and each contains a telescoping member 13 carrying on its bottom end a castor 14 and a locking device 15. Cross members 16 support jacks 17 and jacks 17 support cross members 18. Cross members 19, 21, and 22 (can be the same on each end of the frame) secure side members 10 and 11 and support power cylinders 23 and 24. Platens 25 and 26 are secured to power cylinders 23 and 24 by piston rods indicated at 27. A similar piston rod connects platen 25 to power cylinder 23. Mold halves 28 and 29 are secured to platens 25 and 26 by bolting or other means.

Upper slide 31 and lower slide 32 are secured to side members 10 and 11. Upper bearing 33 is secured to platen 25 and is in contact with slide 31. Lower bearing assembly 34 is secured to platen 25 so that the bearing 39 is in contact with slide 32. The slides 31 and 32 can extend along the entire sides of the frame or they can extend from each end to the farthest point of travel of the platens from the cylinders 23 and 24.

The apparatus of FIGURE 1 is shown positioned to receive a parison 35 (molten mass of thermoplastic material) from an extruder (not shown) through an annular die formed by coaxial tubes 36 and 37. Air for blow molding is introduced via the opening 38 of tube 36.

Power cylinders 23 and 24 are shown as operated by compressed air introduced via conduit 41, two-position, four-way valve 42. As shown, pressure is applied via conduits 43 and 44 to maintain the pistons of cylinders 23 and 24 in retracted position and to maintain the mold halves 28 and 29 in open position. Air is exhausted via conduits 45, 46 and 47.

FIGURE 2 is a view along line 2—2 of FIGURE 1 showing the platen 25 and the relationship of the bearings 30, 33, 39' and 39 to the slides 31', 31, 32' and 32 and to the platen 25. Bearings 39', 39 and 33 are spring loaded whereas bearing 30 is not spring loaded.

The bearing assemblies are shown in greater detail in FIGURES 3, 4, 5, 6 and 7. The bottom bearing holder 40 is secured to the platen 25 by means such as bolts 48 and 48'. The bearing 39 is maintained in contact with slide 32 by the action of springs indicated at 49. The bearing is lubricated by oil introduced to oil grooves 51 via oil hole 52 in slide 32. The oil course groove 51 is shown in the bearing 39 in FIGURE 4. A spring 49 is usually positioned substantially directly below each circle of the oil course 51.

FIGURE 5 shows the spring loaded bearing 33 and the oil passageways 53 leading to the oil courses 54 and 55. The bearing 33 is urged into contact with the slide 31 by the action of springs indicated at 56. The bearing is secured in position by the flanges 57 of the bearing contacting the shoulders 58 of the platen 25, as shown in FIGURE 6. Bearing 30 shown in detail in FIGURE 7 is substantially identical to bearing 33 but is not spring loaded.

It is a feature of the invention that the molding apparatus is operated automatically throughout each molding cycle and can also be operated manually through each step of the cycle. When the molding apparatus is operatively connected to a thermoplastic material extruder and a pair of molding dies is installed in the apparatus, it is usually necessary to establish the time sequence for each step of the cycle. This is done by manual control and the timing mechanism is regulated during the period of manual control.

The circuit for both automatic and manual control is shown in FIGURE 8. Manual operation of the extruder is accomplished by pressing the extruder starting button 61 which actuates the motor starter coil 62 and starts the extruder motor (not shown). The starter coil 62 is operatively connected to normally open switch 63 so as to close switch 63 to maintain an operative circuit after starter button 61 is released. The motor is stopped by pressing stop button 64 which opens the circuit and allows switch 63 to open.

The molding apparatus is operated manually by closing switch 65 to close a circuit comprising electrical lines 66, 67, coil 68, lines 69, 71 and 72. Lines 66 and 72 are connected to a source of electrical power (not shown). Electrical current also flows through resistance 73, rectifier 74 and resistance 75 to charge condenser 76 which in turn discharges through coil 77. When A.C. coil 68 is energized it operates to close switch 78 and close a circuit comprising lines 81, 82, 83 and 84, motor starter coil 62 and line 85. Lines 81 and 85 are connected to a power source (not shown). The motor starter coil is associated with the extruder motor (also not shown). There is a delay in energizing coil 77 and a corresponding delay in opening normally closed switch 86 resulting from charging condenser 76. Similarly, there is a corresponding delay in closing switch 86 when current stops flowing through lines 67 and 69. This delay is selected so as to be greater than the delay in closing switch 63 when starter coil 62 is deactivated by opening the circuit which includes starter coil 62.

Thus, when switch 65 is closed, switch 78 is closed by coil 68 and the extruder motor is started. Switch 63 is closed by coil 62 and switch 86 is opened by coil 77. When switch 65 is opened, switch 78 is opened stopping the extruder motor. Coil 77 maintains switch 86 open until coil 62 is deactivated and switch 63 is opened. Switch 86 is incorporated into the circuit comprising lines 83, 87 and 88 and containing switch 63, which is an integral part of the extruder motor, to provide a means for opening the circuit while the motor is running.

When switch 89 is closed current flows through lines 66, 91 and 72 activating coil 92 which operates valve 42 of FIGURE 1 by means not shown, such as a solenoid, so as to close the mold halves 28 and 29. Switch 93 is then closed so that current flows through lines 66, 94 and 72 activating coil 95 which operates a two-position, three-way valve (not shown) so as to introduce air under pressure into the parison 35 of FIGURE 1 which is confined in the closed mold halves 28 and 29. Switch 93 is then opened deactivating coil 95, stopping the flow of air to the parison 35 and venting the interior of the parison. Switch 89 is then opened deactivating coil 92 and returning valve 42 to its original position so as to open mold halves 28 and 29 thus completing the cycle.

When the timer has been adjusted so as to proceed through the desired time sequence the device is ready for automatic operation. The cycle is started by pressing the starter button so that current flows via lines 72 and 96, timer motor 97, and lines 98 and 66. Motor 97 is mechanically connected to switches 101, 102, 103 and 104 and closes switch 101 so that current passes via lines 99 and 105 during the time cycle. After the predetermined lapse of time the operation of the motor closes switch 102 so that current passes via lines 66, 105 and 67 to coil 68 to start the extruder. When the predetermined time has lapsed to produce a desired parison 35, the timer opens switch 102 and the extruder is stopped as hereinbefore described. Switch 103 is then closed by the timer so that current passes via lines 66, 105 and 106 to actuate coil 92 and close mold halves 28 and 29 as hereinbefore described. The timer then closes switch 104 so that current passes via lines 66, 105 and 107 to actuate coil 95 so as to operate the air valve and to blow the parison into contact with the mold. The timer then opens switch 104 to shut off the air pressure and to vent the interior of the molded article after which the timer opens switches 103 and 101, opening the mold halves and stopping motor 97 to complete the cycle and end the operation. The molded article is then removed from the mold and the cycle is repeated by pressing button 90. The parison 35 is cut from the extruder die by conventional means and can be done any time after the mold halves are closed around the parison.

A timer mechanism such as a single cycle-reset timer obtainable from the Eagle Signal Company and shown in Product Design Catalog File (1961) published by Sweets Catalog Service, New York, can be utilized. Other timers can, of course, be adapted for use.

The illustration of conventional and well-known items such as an extruder, a three-way, two-position valve and the like has been avoided so as to simplify the presentation of the invention.

The extruder can be any conventional extruder utilized in the blow molding of thermoplastic material. Although the invention is described and illustrated as having the air for blow molding introduced through the die head, the air can be introduced at the side of the mold through a needle or the parison or tube of molten plastic can pass downwardly over a tube or mandrel at the bottom of the mold for introduction of air. These methods of blow molding are conventional and form no part of the present invention.

Variations and modifications of the invention are possible within the scope of this disclosure without departing from the spirit and scope of the invention.

That which is claimed is:

1. In apparatus for blow molding comprising a blow molding extruder having means to extrude a parison of thermoplastic material and means to blow air into said parison, means to actuate said extruder, means to actuate the means to blow air into said parison, a frame, a pair of pistons supported horizontally on said frame and concentrically spaced apart, piston actuating means positioned on said frame to support said pistons and to move same concentrically toward and away from each other, means to operate the piston-actuating means, a platen secured to each adjacent end of said pistons, means to secure a blow mold die half to each platen and a pair of mold die halves, the combination therewith of an upper bearing member secured to the side of each platen intermediate the top and bottom thereof; a first pair of slide members each of which is secured to a side of said frame to supply a bearing surface so as to support said platen upon said upper bearing members; means operatively associated with at least one of said upper bearing members to urge said bearing member into contact with said slide member; a bottom bearing holder member secured to each platen at the bottom thereof and extending beyond each side of said platen; a bearing member movably positioned in a recessed portion of each bearing holder member in the portion extending beyond each side of said platen; a second pair of slide members each of which is secured to a side of said frame to supply a bearing surface for said lower bearing members; means operatively associated with said bottom bearing member holders to urge said bottom bearings upward into contact with said second slide members; and adjustable means operatively connected with said frame to position said frame with the mold die halves in operative relationship with said extruder.

2. The apparatus of claim 1 wherein the means to operate the piston actuating means, the means to actuate the extruder means, and the means to actuate the air blowing means comprise manually operated electrical switches in an electrical circuit operatively connected to said molding apparatus and said extruder means.

3. The apparatus of claim 1 wherein the means to operate the piston actuating means, the means to actuate the extruder means, and the means to actuate the air blowing means are comprised in a single-cycle, reset timer means in the electrical circuit of claim 3.

4. The apparatus of claim 3 wherein the manually operated switches of claim 3 are included in the electrical circuit.

5. In blow molding apparatus comprising a rectangular frame, a pair of platens, means to secure a mold die half to the opposing surface of each of said platens, and means to move said platens to contact said mold die halves to form a mold, the combination therewith of a pair of upper slide members and a pair of bottom slide members secured to the longitudinal sides of said frame and adapted to support said platens between said slide members; an upper bearing member operatively attached to each side of said platen so that a bearing surface bears downwardly against the top surface of each upper slide member and a bearing surface bears against the side of each upper slide member; means to urge said upper bearings against the sides of said slides; a bottom bearing holder member attached to the bottom of each platen and having an extension portion extending beyond the side of the platen; a bottom bearing member operatively attached to each bottom bearing holder member so that a bearing member bears upwardly against each bottom slide member; and means to urge said bottom bearing member upwardly against each bottom slide member.

6. The apparatus of claim 5 wherein the means to move said platens is operated by an electrical circuit having included therein a single-cycle, reset timer and manually operated switches.

References Cited in the file of this patent
UNITED STATES PATENTS

| | | |
|---|---|---|
| 2,049,394 | Johnson | July 28, 1936 |
| 2,343,533 | Burham | Mar. 7, 1944 |
| 2,539,769 | Berthiez | Jan. 30, 1951 |
| 2,854,691 | Strong | Oct. 7, 1958 |
| 3,008,191 | Park | Nov. 14, 1961 |
| 3,015,856 | Cohn | Jan. 9, 1962 |
| 3,028,624 | Parfrey et al. | Apr. 10, 1962 |

UNITED STATES PATENT OFFICE
CERTIFICATE OF CORRECTION

Patent No. 3,112,522                      December 3, 1963

Robert Doyle et al.

It is hereby certified that error appears in the above numbered patent requiring correction and that the said Letters Patent should read as corrected below.

Column 5, lines 5 and 7, for the claim reference numeral "3", each occurrence, read -- 2 --.

Signed and sealed this 9th day of June 1964.

(SEAL)
Attest:

ERNEST W. SWIDER                      EDWARD J. BRENNER
Attesting Officer                      Commissioner of Patents